Dec. 16, 1941.   R. ANDERSON   2,266,296
FRACTURE TABLE AND THE LIKE
Filed Oct. 12, 1939   4 Sheets-Sheet 1
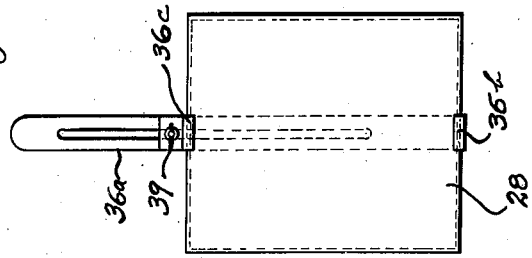
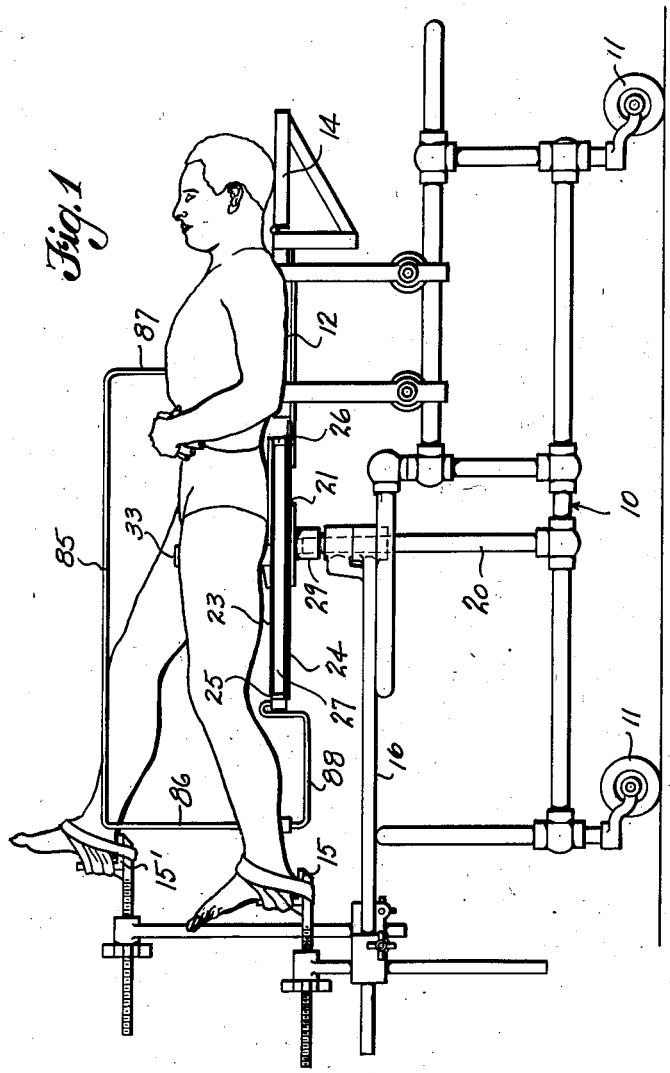
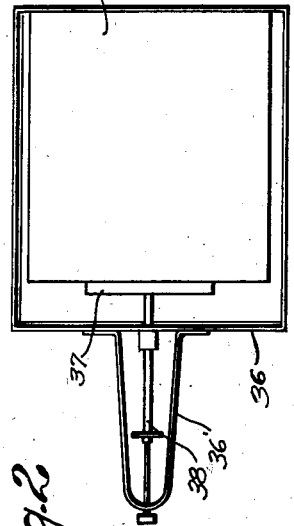
INVENTOR.
ROGER ANDERSON
BY
ATTORNEYS.

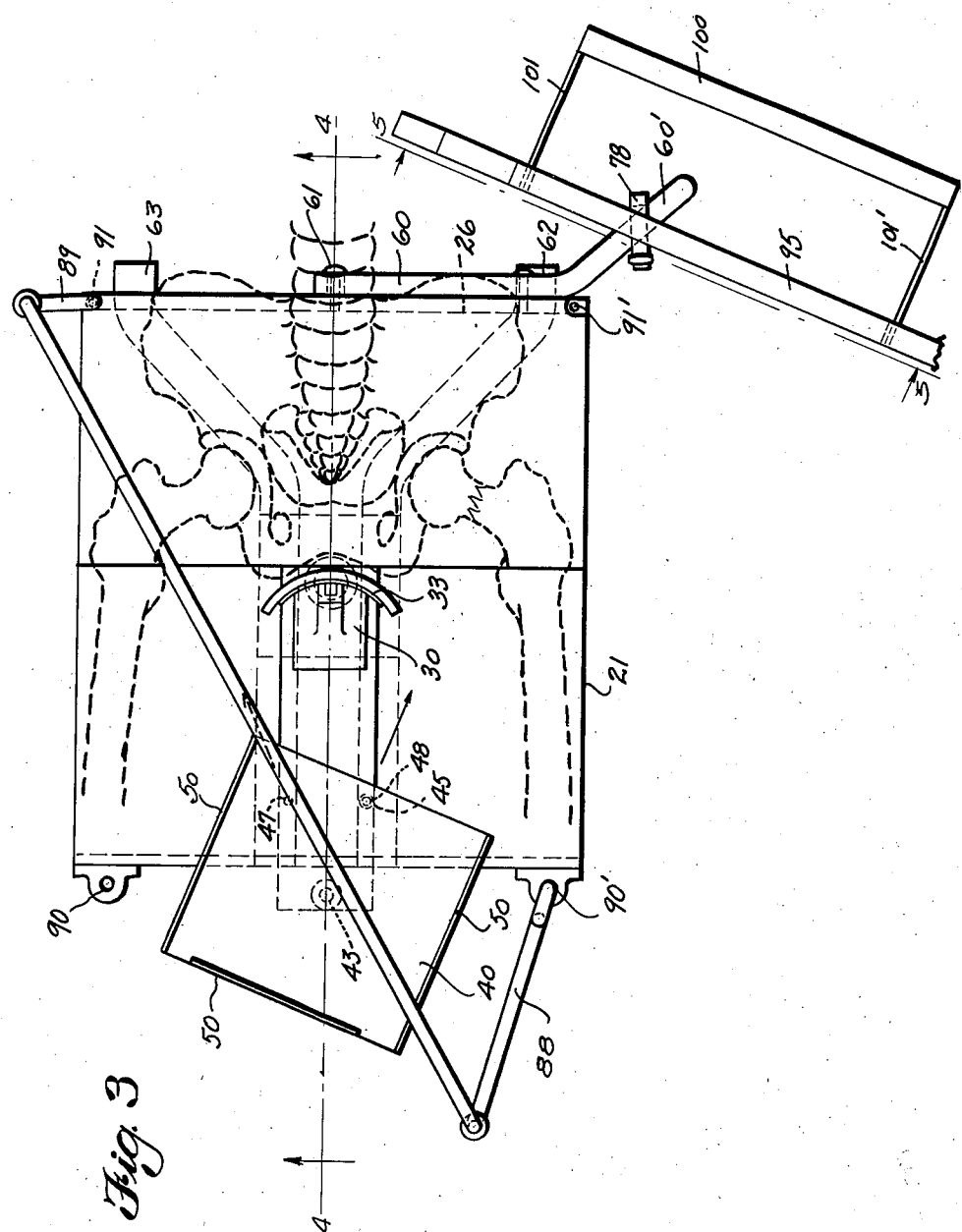

Dec. 16, 1941.   R. ANDERSON   2,266,296
FRACTURE TABLE AND THE LIKE
Filed Oct. 12, 1939   4 Sheets-Sheet 3

INVENTOR
ROGER ANDERSON
BY
Cook & Robinson
ATTORNEY

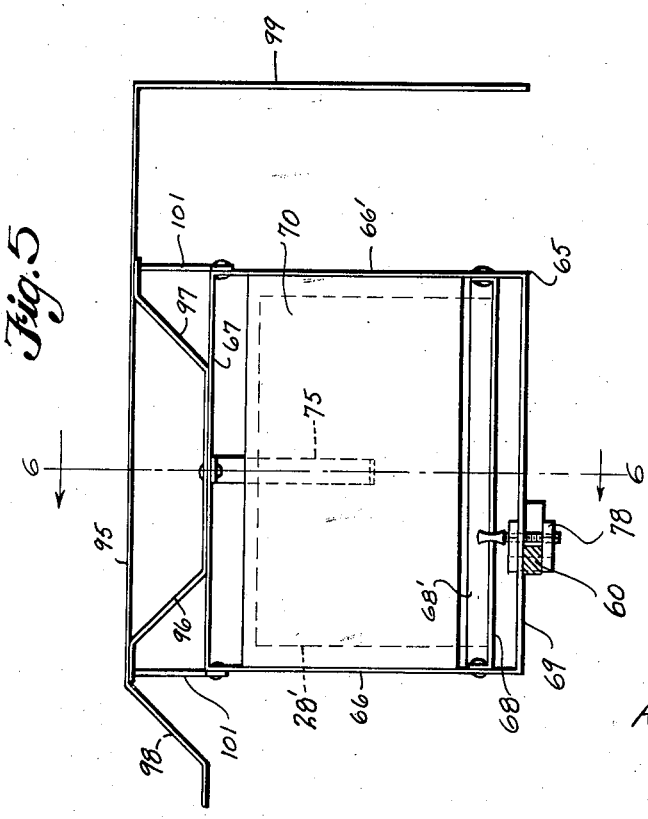

Patented Dec. 16, 1941

2,266,296

UNITED STATES PATENT OFFICE 2,266,296

FRACTURE TABLE AND THE LIKE

Roger Anderson, Seattle, Wash.

Application October 12, 1939, Serial No. 299,155

7 Claims. (Cl. 250—58)

This invention relates to improvements in orthopedic tables, facture tables, and X-ray tables; and has for its principal object to improve the facilities in such tables, and in similar apparatus, for the taking of X-ray photographs of the hips or bones in the pelvic region.

Explanatory to the present invention, it will here be stated that, in tables of the above mentioned kinds as most generally in use today, the arrangement of parts for the support of the patient is such as to interfere with the most satisfactory photographing of the hips or region of the pelvis by X-ray apparatus. This is due to the fact that in such tables, it is customary to provide a sacral rest for the patient under treatment or examination, having a supporting post located directly thereunder which incidentally interferes with the placing of a casette or X-ray film holder in a horizontal plane directly below the hips, but requires that it be disposed somewhat to the side of the body. At best, it is not possible to utilize all of the X-ray film to advantage, and it is not usually possible to get all that is desired on the film. Therefore, procedure as heretofore practised, has required lifting or moving the patient to accommodate the photographer, and this is usually discomforting to the patient and not desirable for various other reasons.

In view of the disadvantages and the inconvenience of taking photographs, and their unsatisfactory character, as above outlined, whenever a study of the hips or bones in the pelvic region is desired, and in view of the possible infection to be caused by the lifting and moving of the patient, it has been the principal object of this invention to so change the character and construction of the sacral rest that it will serve additionally as a cassette holder, yet will in no way interfere with the placing of a cassette or film holder in position for properly obtaining the desired photograph thereon, or of the other apparatus necessary for making the photograph, and will provide that both hips or entire pelvic region may be photographed on one film.

It is also an object of this invention to provide improved means for supporting a cassette and X-ray tube, or lamp, for the making of lateral photograps of the hips or bones of the pelvic regions.

It is a still further object of the invention to provide improved means for the support of sterilized sheets or curtains over the patient during the use of the table in photographing or while treating or operating on the patient, and to provide that the photographer may work from the side of the patient opposite that occupied by the doctor.

Still further objects of this invention reside in the details of construction and combination of parts, and in their mode of operation, as will hereinafter be fully described.

In accomplishing the above and other objects of the invention, I have provided the improved details of construction, the preferred forms of which are illustrated in the accompanying drawings, wherein—

Fig. 1 is a side view of an orthopedic table of common type equipped with improvements embodied by the present invention.

Fig. 2 is a plan view of a preferred cassette holder and a clamp bar for holding cassettes of different sizes in the holder frame.

Fig. 2a is a plan view of a cassette holder of an alternative form.

Fig. 3 is a plan view of the present improved cassette holder and sacral rest, and other improvements associated therewith.

Fig. 5 is an elevation of the cassette holder for use in taking lateral or profile photographs; this view being taken on section line 5—5 in Fig. 3.

Fig. 6 is a cross section, take on line 6—6 in Fig. 5.

Fig. 7 is a perspective view of a pointer used as an aid in positioning the X-ray bulb for a profile photograph.

Fig. 8 is a sectional detail of the perineal post and its mounting; showing the post in that position to which it is adjusted for placing of the patient on the table.

Figure 4:
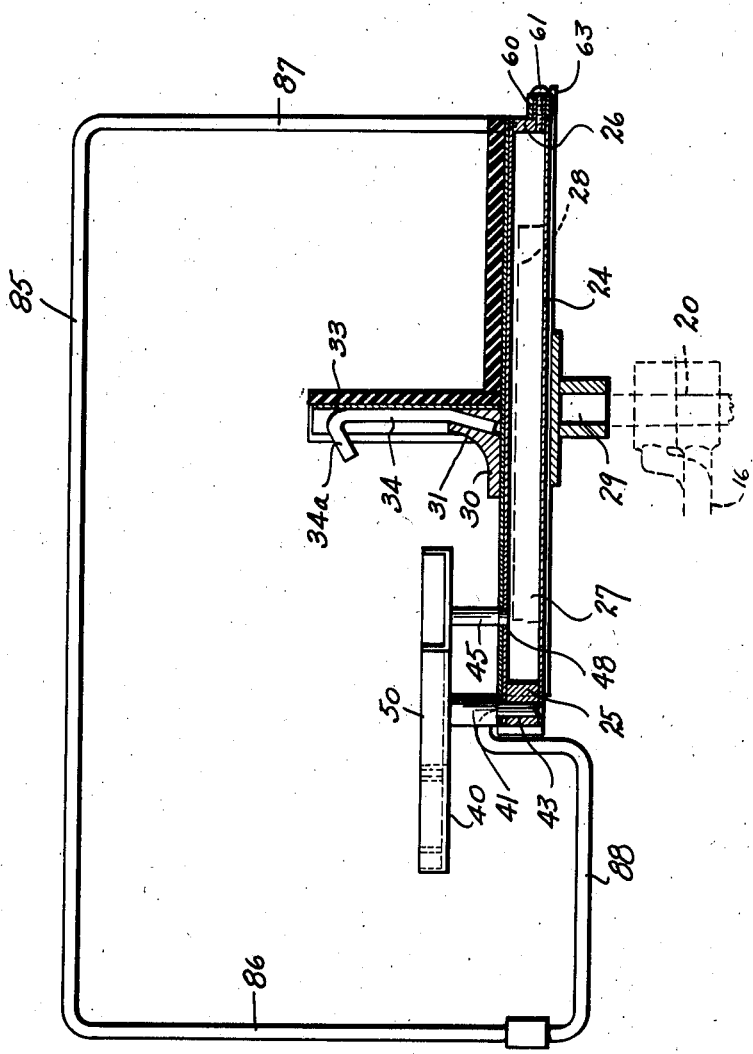
Fig. 4 is a cross sectional view of the present cassette holder, as seen on line 4—4 in Fig. 3.

It will here be stated that the present improvements are intended to be made applicable to orthopedic tables, and the like, as they exist today, and the improved sacral rest, with the various attachments is therefore made as a unit in itself and may be interchangeably used on different tables.

Referring more in detail to the drawings—

In Fig. 1, there has been illustrated a common type of orthopedic table to which improvements embodying the present invention have been applied. The table comprises a substantial and rigid frame structure, generally constructed of tubular elements, and indicated in its entirety by reference numeral 10. The structure is supported by caster wheels 11 in the usual manner to provide for easy movement of the apparatus. Adjustably supported in the frame structure is a body supporting section 12 upon which the patient's shoulders and upper part of the back may rest, and this is equipped with an adjustable, hingedly attached head rest 14. At the foot end of the frame structure are vertically adjustable supports 15 and 15' to which the patient's feet may be bandaged, as shown, to hold the legs in any desired position and through the mediacy of which traction may be applied when such is desired. The supports 15 and 15' are mounted by horizontal arms 16 which may be adjusted angularly apart for spreading the supports 15—15'.

At about the center of the frame structure is a fixed, vertical post 20, which mounts the present combined cassette holder and sacral rest thereon. This sacral rest comprises a flat, horizontally disposed housing 21, serving as a table upon which the patient's buttocks may rest. This housing is of rectangular form, with top and bottom walls 23 and 24, spaced apart by bars 25 and 26 fixed between the walls at opposite ends of the housing, and providing an open passage 27 for the disposition of a cassette or X-ray plate holder within the housing from either side thereof; such a holder being designated at 28 in Fig. 4.

The housing is made of material suitable for its intended use, that is, material such as Bakelite, plastics or metal such as that known as "Dural" or aluminum, which does not materially resist the X-rays.

By reference to Fig. 4, it will be noted that a mounting socket 29 is fixed centrally to the bottom wall of the casette holder or housing 21, and this is removably applied to the upper end of the post 20 to mount the device. In the usual arrangement, the housing 21 is disposed substantially in the same plane as the shoulder table or rest 12. Fixedly mounted centrally upon the top plate 23 of the cassette holder or rest, is a casting 30 formed with a socket 31, and there is countertraction member 33 in the nature of a perineal post, of X-ray transparent material disposed vertically on the housing; this member is the form of a curved plate equipped with a mounting rod 34 fixed lengthwise thereto, with one end portion 34' of the rod inserted in the socket 31 to hold the plate vertical and properly in place. The other end portion, 34a, of the rod 34 is bent downwardly, as noted in Fig. 4, and by dismounting the member from the normal vertical position, the part 34a may be inserted in the socket to hold the post in the reclining position as shown in Fig. 8, thus to protect the patient from the edges of the casting 30 while being placed on or removed from the table.

With the patient located on the table, as illustrated in Fig. 1, it is quite apparent that the combination cassette holder and sacral rest 21 will effectively support the patient for treatment in the same manner as does the usual sacral rest. However, since the housing 21 is hollow, a cassette with X-ray film or plate enclosed may be inserted in the housing from either side for photographing the entire pelvic area, and both hips at the same time, without inconvenience or interference to the patient.

In Fig. 2 is illustrated a preferred handling means for a cassette 28. This comprises a shallow, rectangular pan 36 of material that is transparent to X-rays, and equipped with a handle 36'. The cassette is placed for use in the pan, and when smaller than the pan may be held against movement therein by a clamp bar 37 with a control rod 38 extended to the outer end of the handle.

In Fig. 2a, I have illustrated a cassette 28 as having a handle 36a applied directly thereto for easy handling of the cassette in inserting it into the housing 21 and for effecting a proper or desired adjustment thereof, so as to place the plate beneath any desired or specified area. This bar 36a has an upturned hook 36b at one end designed to engage about one edge of the cassette, and has a sliding clamp 36c mounted for adjustment along its other end portion and to be fixed by a bolt and wing nut 39 and adapted to holdingly engage the other edge of the cassette. The bar may then be used as a sort of handle for insertion of the cassette in the housing 21 and for moving it therein to a desired location with reference to the specific area of the patient to be photographed.

In the case of photographing the hips or pelvic area, the X-ray tube would be placed directly above the patient and its rays directed down through the patient and cassette holder to form a direct image on the X-ray film.

In order to simplify, as well as to expedite, the taking of lateral, or profile X-ray photographs of the hips, I have provided a mounting platform 40 for the X-ray lamp or tube, and this has a central mounting stud 41 on its under side adapted for insertion in a vertical socket 43 in the center line of and at the lower edge of the housing 21. There is also a post 45 extending downwardly from the upper edge of the platform, to be inserted at its lower end into one or the other of two holes 47 and 48 formed in the top wall of the housing as noted in Fig. 3. These holes 47 and 48 are spaced equal distances at opposite sides of the central line of the table and, with the platform applied, will establish the correct positions of the platform for either the right or left side photograph. The platform is provided at opposite sides and at the lower end edge with upturned flanges 50 between which the base of a common tube will be fitted in use, and the tube will thereby be held in the exact direction for the desired photograph.

Pivotally attached to the upper end edge of the housing 21, and in the center line thereof, is an arm 60 held by a pivot pin or bolt 61. The arm may be swung in a vertical plane to extend toward either side of the patient, and there are supports 62 and 63 projecting beyond the edge of the housing, at opposite sides of the pivot, on which the arm may be rested. The outer end portion 60' of the bar is bent angularly as noted in Fig. 3, and mounts a cassette holder 65 thereon. This holder is of novel construction and will now be described.

By referring to Figs. 5 and 6, it will be noted that the cassette holder 65 comprises a rectangular frame, having vertical opposite side bars 66 and 66', a horizontal top cross bar 67 and vertically spaced lower end cross bars 68 and 69. A flat plate 70 is fixed across the frame between the side bars to close one side thereof and thus to provide for the support in the frame of a cassette as designated in dotted lines at 28'.

A spring metal clamp arm 75 is pivotally fixed to cross bar 67 and extended downwardly therefrom as a means for retaining a cassette in the frame; it being understood that when the cassette is in place, it rests upon the cross rail 68, between the opposite side bars of the frame and is held tightly against the plate 70 by the pressure of the spring clamp arm 75. To better hold the cassette in place, the cross bar 68 has an upturned flange 68'.

The frame 65 may be secured in vertical position upon the outer end portion of the arm 60 when extended to either side and held at a set position thereon by a clamp 78 applied about the lever and bottom cross bar of the frame as shown in Fig. 6.

It is to be understood that the arm 60 may be swung to either side of the patient, depending upon which side or hip is to be photographed, and that after it has been adjusted to the desired side, the cassette holder 65 may be applied thereto. Likewise, it is understood that the lamp mounting platform 40 may be adjusted to the proper direction for either right or left side photographs.

It is sometimes the case that the small portable X-ray tube intended for mounting on platform 40 is not available, and in this case a tube stand is rolled into place with the platform removed. In such case, it is difficult to accurately judge the exact direction in which to point the X-ray tube because of the draping of sterilizing curtains over the patient and apparatus. Furthermore, many X-ray operators do not have the necessary knowledge of human anatomy to know just how to place the tube to the best advantage. Therefore, I have provided a pointer, as shown in Fig. 7, adapted to be applied to the housing 21, before the sterile drapes or curtains are placed about the patient, and whereby the proper direction will be indicated regardless of the fact that sterile curtains or sheets cover the patient and obstruct the view of the X-ray operator.

This pointer, as seen in Fig. 7, comprises a single wire, bent to form a straight pointing finger 80 on a standard 81 with two vertical mounting posts 82 and 83. The post 82 may be applied to the socket 43 and the post 83 may be inserted in either one or the other of the holes 47 and 48 in which the platform mounting post 45 is adapted to be applied. When the pointer is so applied, the finger will indicate exactly the direction in which the X-rays should be directed to properly photograph the hip selected.

Means is provided also in the present instance for a better holding and draping of the sterile sheets or curtains which are suspended between the patient and operator as a means for protecting the patient against contamination. As seen in Fig. 1, I provide a rod or wire 85 which is adapted to be extended horizontally above the patient and in a direction diagonal of the frame. This rod is provided with downwardly directed leg portions 86 and 87, which, at their lower ends, have swiveled or pivotal mounting respectively on horizontal rods 88 and 89. Rod 88 is adapted to be mounted in either of two sockets 90 or 90' fixed to the lower corner portions of the housing 21, and rod 89 likewise may be applied to either of two sockets 91 and 19' in the upper corner portions of the housing. The length of the rods 88 and 89 is such as to hold the rod 85 diagonally of the housing, as shown in Fig. 3, and its position is generally determined by the position of the operator with reference to one or the other side of the patient, or the side of the patient to be worked on.

I have also equipped the cassette holder 65 with means for support of the sterile sheet. This means comprises a horizontal bar 95 pivotally fixed directly above the top rail of the cassette frame by brackets 96 and 97 to extend somewhat beyond the right or left side limits of the frame as needed, and formed at one end with a downwardly inclined end portion 18, and at its other end with a vertical, depending leg 99. This support cooperates with the bar 85 to hold the sterile sheet in proper or desired position for the protection of the patient and permit the photographer to work at the side of the sheet opposite that at which the operation or treatment is being performed on the patient. Also there is a bar 100, supported parallel to bar 95 at some distance back of the cassette holder, by arms 101 and 101', as best seen in Fig. 6; these arms being attached to the upper corners of the frame 5. This holds the sheet away and facilitates placing or removing the cassette in the holding frame.

There are many advantages in the use of the present device. First, the device is appliable to various machines; it provides that the X-ray technician may work at the side away from the operator or doctor and behind the sterile fence provided by the curtains or drapes. X-ray photographs, in any number desired, may be taken without disturbing the patient, quickly, conveniently and without distortion, and to the best advantage of the film. The arrangement of parts provide for an easy positioning of the X-ray tube and placement of the film for proper photographing by one not necessarily an expert. In fact, the present apparatus provides what may be termed a "one-man" technique that may be practised as well and with as good results by the country doctor as by the specialist with many assistants.

It is to be explained that it is not always essential that the sacral rest be used with a frame structure or on a fracture table. In many instances it may be very conveniently placed directly upon an ordinary table or bed. For that reason, it is not the intent that the claims limit the structure to use with a fracture or orthopedic table.

Furthermore, since in the use of such sacral rests, the patient's symphysis pubis is always located up against the perineal post, and the legs are most conveniently disposed at from 25° to 30° abduction, there is a definite direction for the taking of lateral X-ray photographs, and therefore, in lieu of the pointer, as shown in Fig. 7, being used, marks may be applied directly upon the top surface of the sacral rest, as indicated by the use of arrows in Fig. 3.

Having thus described my invention, what I claim as new therein and desire to secure by Letters Patent is:

1. In an apparatus of the character described, a sacral rest of table-like form, a perineal post on the rest; said rest having a passage horizontally therethrough for reception of a cassette and means on one end of the rest for the support of a lateral cassette holder for use in the making of complemental radiographs of the hips of a person placed on the rest.

2. In an apparatus of the character described, a sacral rest of table-like form, having a passage therethrough for reception of a cassette, a perineal post on the rest means on one end of the rest for the support of a lateral casette holder, and a platform mounted on the other end of the rest for the fixed mounting of an X-ray tube in porper direction and relationship to the lateral cassette holder for use in the making of complemental radiographs of the hips of a person placed on the rest.

3. In an apparatus of the character described, a sacral rest of table-like form, having an open passage therein for reception of a cassette, a perineal post on the rest means on the upper end of the said rest for the support of a lateral cassette holder for use in the making of complemental radiographs of the hips of a person placed on the rest, and a platform mounted on the lower end of the rest for mounting of an X-ray tube; said platform having guide means thereon for directing the tube properly toward the lateral cassette holder.

4. In an apparatus of the character described, a sacral rest of table-like form, having an open passage therethrough for reception of a cassette, a perineal post on the rest, an arm attached to the upper end of the rest to extend laterally to either side of the rest as a mounting for cassette holding frame as used in the making of complemental radiographs of the hips of a person placed on the rest, a frame mounted on the arm, and means for supporting the frame at different positions along the arm.

5. In an apparatus of the character described, a sacral rest provided with an open passage horizontally therethrough for containing a cassette in the making of complemental radiographs of the hips of a patient supported on the rest, and a perineal post on the sacral rest for gauging the patient's position relative to the location of the passage and means for supporting from the table of an X-ray tube and cassette for the taking of radiographs complemental to those of cassettes in the said passage.

6. In an apparatus of the character described, a sacral rest of table like form having an open passage horizontally therethrough for containing a cassette to be used in the making of complemental radiographs of the hips of a person disposed on the rest, a platform mounted on the rest at one end thereof for the functional support of an X-ray tube; said platform having mounting devices and said table having means adapted to selectively receive said devices to accurately locate the platform in positions to direct the tube for the photographing of right and left side lateral views, and an adjustable means for supporting a cassette for the taking of the right and left views by said tube to complement the views made by use of the first mentioned cassette.

7. In an apparatus of the character described, a sacral rest of table like form, having a passage horizontally therethrough for containing a cassette, a perineal post on the rest, an arm pivotally attached to the rest at one end thereof and adapted to be adjusted to either side of the rest, a frame structure removably fixed to the end of the arm and applicable thereto in either of its positions for the functional support of a cassette to be used in conjunction with the first mentioned cassette in the making of complemental radiographs of the hips of a person supported on the rest and means for supporting the arms in either of its selected positions.

ROGER ANDERSON.